Jan. 23, 1962
P. B. J. HEBBEN
3,018,315
ELECTRIC STORAGE CELLS, THEIR CONSTRUCTION
AND PROCESS FOR THEIR OPERATION
Filed June 26, 1959
2 Sheets-Sheet 1
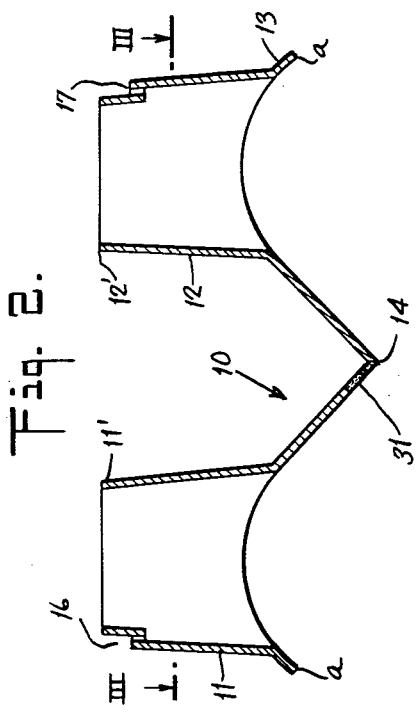
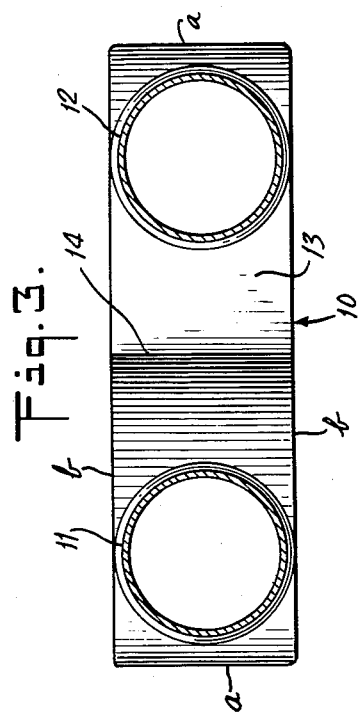
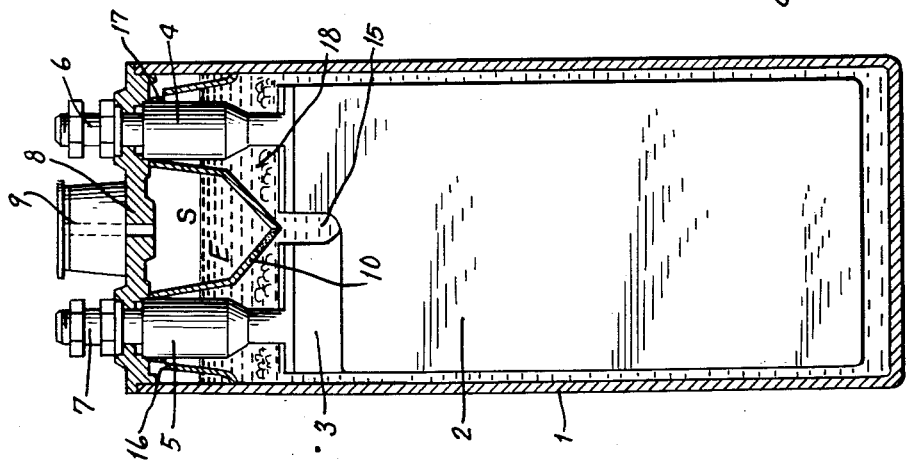
INVENTOR.
PHILIPPE BENOIT JEAN HEBBEN
BY
ATTORNEYS

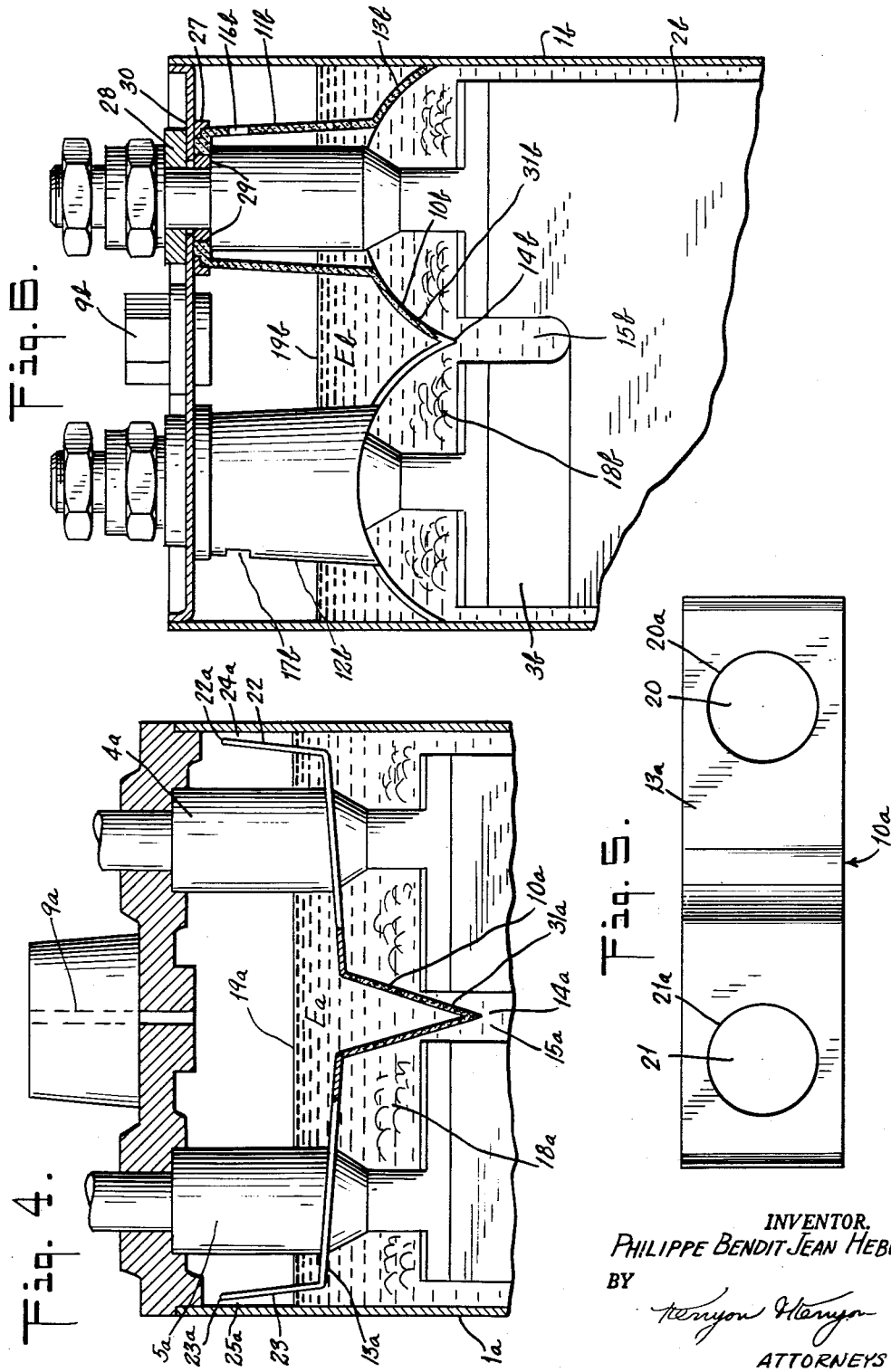

United States Patent Office 3,018,315
Patented Jan. 23, 1962

3,018,315
ELECTRIC STORAGE CELLS, THEIR CONSTRUCTION AND PROCESS FOR THEIR OPERATION
Philippe Benoit Jean Hebben, Montmorency, France, assignor to Societe des Accumulateurs Fixes et de Traction (Societe Anonyme), Romainville, France, a French company
Filed June 26, 1959, Ser. No. 823,046
Claims priority, application France July 12, 1958
2 Claims. (Cl. 136—163)

This invention relates to electric storage cells, their construction and a process for their operation.

An object of the present invention is a process for constructing an electric storage cell, said cell being of any known type. Another object of the invention is a construction which involves an application of this process. Still another object of the invention is a process for operating cells of the character described.

It is already well-known that the charge and overcharge of a storage cell may give rise to the evolution of gases. Such evolution creates a problem of increasing importance as the rate of charging or overcharing increases. When the evolved gases traverse the electrolyte particularly above and between the cell's plates, they cause a turbulence whose violence increases as a function of the rate of evolution of the gases. This turbulence may cause the electrolyte to escape by being transported or carried by the gases outwardly of the cell through valved openings or gas vents thereof as droplets, spray, mist or splash. Since usually the electrolyte whether alkaline, acid or of another kind, is highly corrosive or otherwise injurious to the cell's ambient environment and to users its escape from a cell is inherently dangerous. Principal objects and features of the present invention are to suppress the aforedescribed escape of electrolyte through the gas vent or vents of a cell or cells.

The process according to the invention is unique in that it prevents the gases evolved during the charge or overcharge from moving in a direct path, e.g., ascending or rising in a straight path to the surface of the electrolyte and in constraining them to follow a round-about path to such surface by movement through narrow passageways or iters and/or around baffles before passing through a valve opening or gas vent of the cell.

According to another feature of the invention, the said narrow passageways, iters and/or baffles are placed in a zone preferably in the upper part of the cell at a location where the said cell contains free electrolyte, i.e., at a location clear of the electrodes and primarily providing a zone proximate to the electrolyte surface intended to be quiescent.

According to still another feature of the invention, the said narrow passageways, iters and/or baffles are obtained by using a partition which also has a portion dipping or partially penetrating into spaces between the cell's electrodes proximate to the terminals of the latter.

In this way the evolved gaseous flow is so broken up, its intensity is so decreased and the turbulence of the electrolyte is so diminished that a very quiet flow is obtained through the zone of quiescence, said flow carrying substantially no liquid droplets, spray or mist, or splash, either beyond the surface of the electrolyte or outwardly of the cell.

The device according to the invention is novel in that it comprises a component or part made of insulating material, which is substantially unalterable by the electrolyte of any particular cell, used as a deflector or partition, situated preferably in the upper part of the cell, at a location where the said cell possesses a stored quantity of electrolyte, thus separating the bulk of said electrolyte from the vent or valve provided in the casing, and leaving only narrow passages.

Other objects and features of the invention will appear from the following description and in the accompanying drawings.

In the said drawings, serving only as examples of the invention:

FIGURE 1 is a cross-section of an improved storage cell embodying the invention.

FIGURE 2 is a sectional view on a larger scale of the deflector partition used in the construction of FIGURE 1.

FIGURE 3 is a sectional view taken along the plane of line III—III of FIGURE 2 and viewed in the direction of the indicating arrows.

FIGURE 4 is a sectional view of a part of a storage cell according to another embodiment of the invention.

FIGURE 5 is a plan view of the deflector used in FIGURE 4, as seen from above.

FIGURE 6 is a view similar to FIGURE 4 of a part of a cell according to still another embodiment of the invention.

According to the embodiment of FIGURES 1–3, the storage cell is enclosed in a casing 1 and comprises positive and negative electrodes 2 and 3. The said electrodes respectively comprise a terminal 4 or 5 extending outwardly through the casing and terminating in respective threaded heads 6 and 7 for electrical connection. The cover 8 of the casing is provided with a vent 9 which in a sense functions as a valve for controlling the rate of egress of the gases evolved in the cell during use.

A member 10 used as a deflector or partition is positioned above the plates 2 and 3, i.e., in a position intermediate the plates and the vent.

According to the example of FIGURES 1–3, this deflector 10 comprises two sleeves 11 and 12 each having a substantially tapered shape, and respectively intended to surround the terminals 4 and 5, said sleeves both being attached to a plate 13, and the outward edges 11' and 12' of said sleeves being adapted to be pressed against or else secured to the underside of the cover 8. The plate 13 includes a portion 14, said portion 14 having a V- or U-shaped or similar section, whose apex or greatest depth is directed downwards, and admeasured to penetrate into the space S between the electrode terminals 4 and 5 and even, ultimately, into the space 15 lying between the electrodes 2 and 3 themselves.

Openings 16, 17 are provided, in the respective sleeves 11 and 12 for example. These openings function as escapes for gases accumulating in the sleeves during operation of the cell so that they may ultimately reach the vent 9 in a devious path.

Plate 13 has peripheral dimensions corresponding substantially with the internal surface dimensions of the cell into which it is placed. If polygonal in shape, e.g., rectangular, as seen in FIGURE 3, it has preferably a width and length substantially corresponding to the internal width and depth of the cell in which it is placed. In this way its peripheral edges may be applied snugly against correspondingly dimensioned internal surfaces of the casing.

The operation of the above-described device is simple.

When the cell is submitted to a charging current, even at a high rate, massive gaseous evolution occurs, but it is limited or confied to the spaces 15 and 18 which lie below the surface of the cell's electrolyte E and on the undermost or inner side of said plate. This plate 13 prevents bubbles from travelling directly to the vent 9. If the edges $a$, $b$ of the plate bear tightly against the inner surface of the casing 1, the evolved gases cannot escape or flow to the vent 9 except through openings 16 and 17 in sleeves 12 and 13 which lie clear of the surface of the electrolyte. This escape is quiet; no liquid droplet is carried away by the escaping gases. The electrolyte E lying in space 19 on the vent side of the plate 13 remains quiescent. Thus no substantial transportation of electrolyte as droplets, spray, mist or splash outwardly of vent 9 can occur.

The embodiment of FIGURES 4 and 5 may be adopted too. In this embodiment, components identical with those of FIGURES 1–3 bear identical reference characters with the added subscript a. The member 10a serving as a deflector or partition whose function is akin to that of partition 10 of FIGURES 1–3 inclusive, does not have sleeves like the sleeves 11 and 12. Instead, openings 20 and 21 are provided in plate 13a for terminals 4a and 5a and their inner edges 20a and 21a engage the said terminals in a practically tight way, i.e., with substantial sealing. The plate 13a is flanged upwardly at 22 and 23 and the edges of 22a and 23a of the flanges stand slightly away from the inner surface of casing 1a, thus forming narrow channels or iters 24a and 25a for the passage of gases.

Member 10a, like member 10, is preferably of material unalterable to the electrolyte of the cell into which it is intended to be mounted.

The portion 14a of plate 13a has been shown as extending into the space 15a. Portion 14a while shown as more acutely V-shaped may likewise be U- or otherwise similarly shaped in section in the manner described with respect to the modification of FIGURES 1–3 inclusive.

Operation of the modification of FIGURES 4 and 5 is substantially similar to that of FIGURES 1–3. In this instance, however, the indirect escape path for evolved gases in spaces 15a and 18a in the electrode side of partition plate 13a to the vent 9a is via the iters or channels 24a and 25a above the surface 19a of the electrolyte Ea on the vent side of plate 13a so that the latter remains quiescent. The gas escape is quite and the indirect path it is compelled to take in transit to vent 9a eliminates both turbulence in the electrolyte Ea lying in space 19a and substantially eliminates the escape of electrolyte in any form via the vent 9a with the gases.

The embodiment of FIGURE 6 likewise may be used. In this embodiment components identical with those of FIGURES 1–5 inclusive bear identical reference characters with the added subscript b. The member 10b serving as a deflector or partition whose function is akin to those of partitions 10 and 10a is shown partially in section at the right half and partially in side elevation at the left half of FIGURE 6. The sleeves 11b and 12b of this partition have their outermost rims or top edges united in any conventional way to the conventional sealing means terminals of the particular cell with which member 10b is utilized. As before the member 10b is of material that is substantially unalterable by and/or unaffected by the electrolyte of the cell in which it is intended to be used.

The sleeves 11b and 12b at their outermost ends each include an annular rim or shoulder like the shoulder 27 shown in FIGURE 6 upon which is positioned a ring or an annular cup 28, a sealing gasket 29 being positioned between each shoulder and each cup.

The plate 13b may be shaped in any desirable way to provide one or more cusps 14b whose function is the same as that of portions 14 and 14a. While cusp portion 14b is shown as a sharp intersection of a pair of adjoining circular arcs, it can be modified to have V-shape or U-shape or other similar shape in section. As with the structure of the earlier-described modification of FIGURES 1–3 the periphery of plate 13b is dimensioned to match the internal contour of the walls of casing 1b so as to effectively seal off the portion 19b of the electrolyte Eb from that in the spaces 15b and 18b thereof on the opposite side of said plate 13b. Gas escape vents 16b and 17b are provided on sleeves 11b and 12b at locations remote from the position of vent 9b in cover 30 of the cell's casing 1b. The openings 16b and 17b are of dimensions comparable to those of the openings 16 and 17 and like said openings function as escapes for gases accumulating in the sleeves 11b and 12b during operation of the cell so that they may ultimately reach the vent or vents 9b in a devious or indirect path from the turbulent zones or spaces 15b and 18b of electrolyte without disturbing the quiescence of the electrolyte in the zone or space 19b on the vent side of plate 13b. Thus no substantial transportation of electrolyte as droplets, spray, mist, splash or otherwise outwardly of vent 9b can occur.

The plates 13, 13a and 13b as described obviously may be modified in shape to provide combinations of passageways or iters like channels or iters 24a and 25a and openings like openings 16, 16b, 17 and 17b for particular cell requirements.

The deflectors or baffles 10, 10a and 10b are provided in their lowermost portions 14, 14a and 14b with apertures represented diagrammatically and on an enlarged scale by the respective openings 31, 31a and 31b. The dimensions of these openings are such as to permit seepage of electrolyte from the vent side of the plates 13, 13a or 13b as the case may be through to the electrode side of said plates to facilitate filling of the cells with electrolyte, but they are not such as to allow large bubbles through.

Tests have been made with storage cells of 35 amps./hours rated capacity provided with partitions, deflectors or members like those 10, 10a and/or 10b embodying the invention as hereinabove described. The electrolyte in such cells has been set so that its level at the end of charge lies 15 mm. from the inner end of the vent 9, 9a or 9b at the end of charge.

With such cells even during an overcharge at an intenity of 40 amps. or more, no appearance of the cell's electro'yte in the form of droplets, spray, mist or splash or otherwise externally of the vent has been observed. These observations were made on cells utilizing among others alkaline and acid electrolytes of conventional types.

The partitions or deflectors described herein are deemed novel industrial products per se as they may be incorporated in storage cells extant as well as in newly manufactured storage cells.

While specific embodiments and examples of the invention have been described and shown, variation in operational or structural detail within the scope of the appended claims is possible and is contemplated. There is no intention of limitation therefore to the exact disclosures herein made.

What is claimed is:

1. In an electric storage cell having an enclosing casing, a cover for the casing provided with a vent, electrodes of differing polarity with spacing between them, spaced apart electrode terminals within the casing and depending from the cover and electrolyte within the casing whose uppermost surface lies spaced from the cover and vent, a baffling member within the casing of material substantially unalterable in the electrolyte, said baffling member including a plate portion submerged in the electrolyte to provide an uppermost quiescent zone of electrolyte directly adjacent the surface of the latter, a portion depending from the plate portion and extending downwardly between the electrodes and having an aperture to facilitate filling of the cell with electrolyte, and tubular portions extending upwardly from the plate portion and surrounding the electrode terminals within the casing and with the outer ends of said tubular portions engaging the cover, said tubular portions having iters therein located within the cell above the surface of the electrolyte and remote from the vent to provide gas escape passages into a space within the cell above said quiescent zone and in an indirect path to said vent so that gases evolved in the cell by-pass said quiescent zone of electrolyte and thereby preclude transit outwardly of the vent of electrolyte from the cell as a result of turbulence thereof by said evolved gases.

2. In an electric storage cell having an enclosing casing, a cover for the casing provided with a vent, electrodes within the casing, electrode terminals within the casing depending from the cover and electrolyte within the casing whose surface lies spaced from the cover and vent, a baffling member within the casing of material substantially unalterable in the electrolyte, said baffling member including a plate portion submerged in the electrolyte to provide a quiescent zone of electrolyte adjacent the surface of said electrolyte, tubular portions on said baffling member surrounding the electrode terminals within the casing and with the outer ends of said tubular portions engaging the cover, said tubular portions having iters therein located within the cell above the surface of the electrolyte and remote from the vent to provide gas escape passages into a space within the cell above said quiescent zone and in an indirect path from said space to said vent so that gases evolved in the cell by-pass said quiescent zone of electrolyte and thereby preclude transit outwardly of the vent of electrolyte from the cell as a result of turbulence thereof by said evolved gases.

References Cited in the file of this patent
UNITED STATES PATENTS

| | | |
|---|---|---|
| 2,027,310 | Smith | Jan. 7, 1936 |
| 2,505,207 | Riggs | Apr. 25, 1950 |

FOREIGN PATENTS

| | | |
|---|---|---|
| 744,443 | France | Jan. 21, 1933 |